United States Patent
Degady et al.

(10) Patent No.: US 7,322,311 B2
(45) Date of Patent: Jan. 29, 2008

(54) CONTINUOUS COATINGS OF GUM PRODUCTS

(75) Inventors: Marc Degady, Morris Plains, NJ (US); Miles Van Niekerk, Madison, NJ (US)

(73) Assignee: Cadbury Adams USA LLC, Parsippany, NJ (US)

(*) Notice: Subject to any disclaimer, the term of this patent is extended or adjusted under 35 U.S.C. 154(b) by 0 days.

(21) Appl. No.: 11/174,039

(22) Filed: Jul. 1, 2005

(65) Prior Publication Data

US 2005/0244539 A1    Nov. 3, 2005

Related U.S. Application Data

(60) Division of application No. 10/011,654, filed on Dec. 4, 2001, now Pat. No. 6,913,773, which is a continuation-in-part of application No. 09/374,935, filed on Aug. 16, 1999, now Pat. No. 6,365,203.

(51) Int. Cl.
A23G 4/00 (2006.01)
A23G 3/26 (2006.01)
B05C 5/00 (2006.01)

(52) U.S. Cl. .............. 118/13; 118/19; 118/20; 118/24; 118/313

(58) Field of Classification Search ............ 118/13, 118/19, 20, 303, 312, 320, 24, 313; 99/494; 426/302–305, 5
See application file for complete search history.

(56) References Cited

U.S. PATENT DOCUMENTS

| | | | |
|---|---|---|---|
| 3,167,035 A | 1/1965 | Benson | |
| 4,317,838 A | 3/1982 | Cherukuri et al. | |
| 5,010,838 A | 4/1991 | Simelunas et al. | |
| 5,100,683 A | 3/1992 | Singer et al. | |
| 5,270,061 A | 12/1993 | Reed et al. | |
| 5,376,389 A | 12/1994 | Reed et al. | |
| 5,433,964 A | 7/1995 | Norman et al. | |
| 5,495,418 A * | 2/1996 | Latini et al. | 700/123 |
| 5,536,511 A | 7/1996 | Yatka | |
| 5,545,417 A | 8/1996 | Richey et al. | |
| 5,603,970 A | 2/1997 | Tyrpin et al. | |
| 5,665,406 A | 9/1997 | Reed et al. | |

(Continued)

FOREIGN PATENT DOCUMENTS

EP    0 273 000    6/1988

(Continued)

*Primary Examiner*—Yewebdar Tadesse
(74) *Attorney, Agent, or Firm*—Hoffmann & Baron, LLP

(57) ABSTRACT

A continuous coating process 30 for chewing gum and bubble gum materials. Small cores or pieces of gum material 20 are introduced into inclined rotating drums 34, 34' in which heated air 52 is circulated and a coating solution 50 is applied (liquid or powder). The coating material is dried on the pieces of material, and a plurality of thin layers are formed on each of the cores or small pieces of material. A series of rotating drums can be provided to provide the requisite number or thickness of coating layers. In an alternate embodiment, initial coatings of material can be provided on the cores by a batch-type process before the materials are introduced into the continuous coating drums. The formulas for the coating solution can also be adjusted at different stages of the coating process in order to provide a more consistent and uniform coating.

7 Claims, 2 Drawing Sheets

U.S. PATENT DOCUMENTS

| | | |
|---|---|---|
| 5,698,252 A | 12/1997 | Kelly et al. |
| 5,716,652 A | 2/1998 | Barkalow et al. |
| 5,721,012 A * | 2/1998 | Long et al. .................. 427/212 |
| 5,964,146 A | 10/1999 | Kelly et al. |
| 5,965,181 A | 10/1999 | Barkalow et al. |
| 5,980,955 A | 11/1999 | Greenberg et al. |
| 6,056,822 A * | 5/2000 | Jefferson et al. ............ 118/683 |
| 6,142,095 A * | 11/2000 | Long ........................... 118/13 |
| 6,190,705 B1 | 2/2001 | Richey |
| 6,206,968 B1 * | 3/2001 | Minges ....................... 118/683 |
| 6,290,985 B2 | 9/2001 | Ream et al. |
| 6,322,806 B1 | 11/2001 | Ream et al. |
| 6,365,203 B2 | 4/2002 | Degady et al. |

FOREIGN PATENT DOCUMENTS

| | | |
|---|---|---|
| EP | 0 506 251 | 9/1992 |
| EP | 0 923 883 | 6/1999 |
| WO | WO 01/11984 | 2/2001 |

* cited by examiner

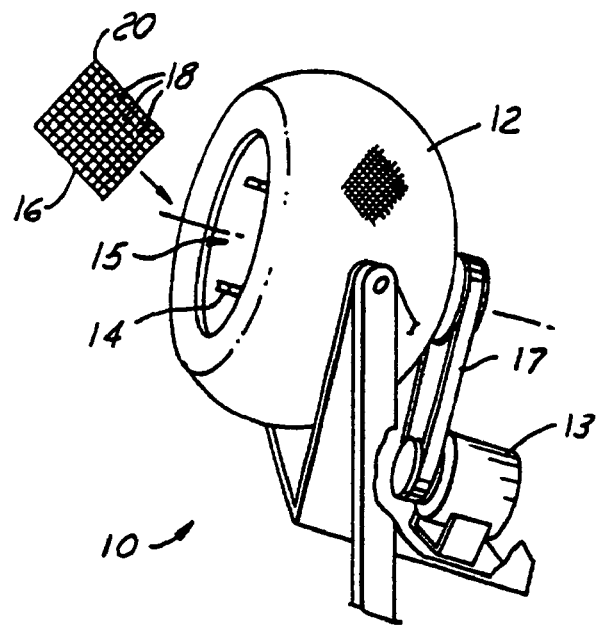
(PRIOR ART)
FIG. 1
(PRIOR ART)
FIG. 2
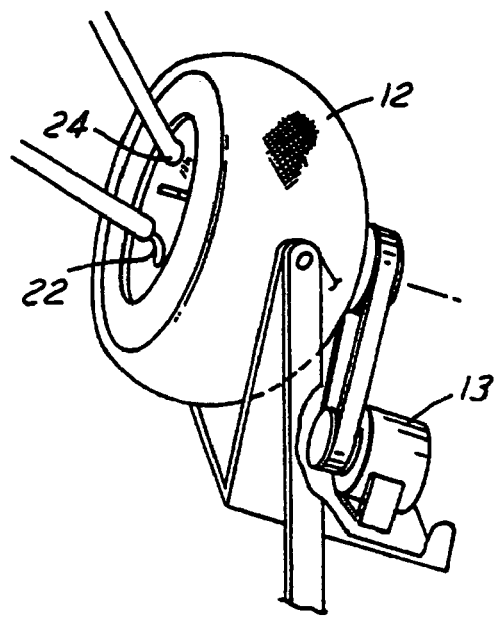
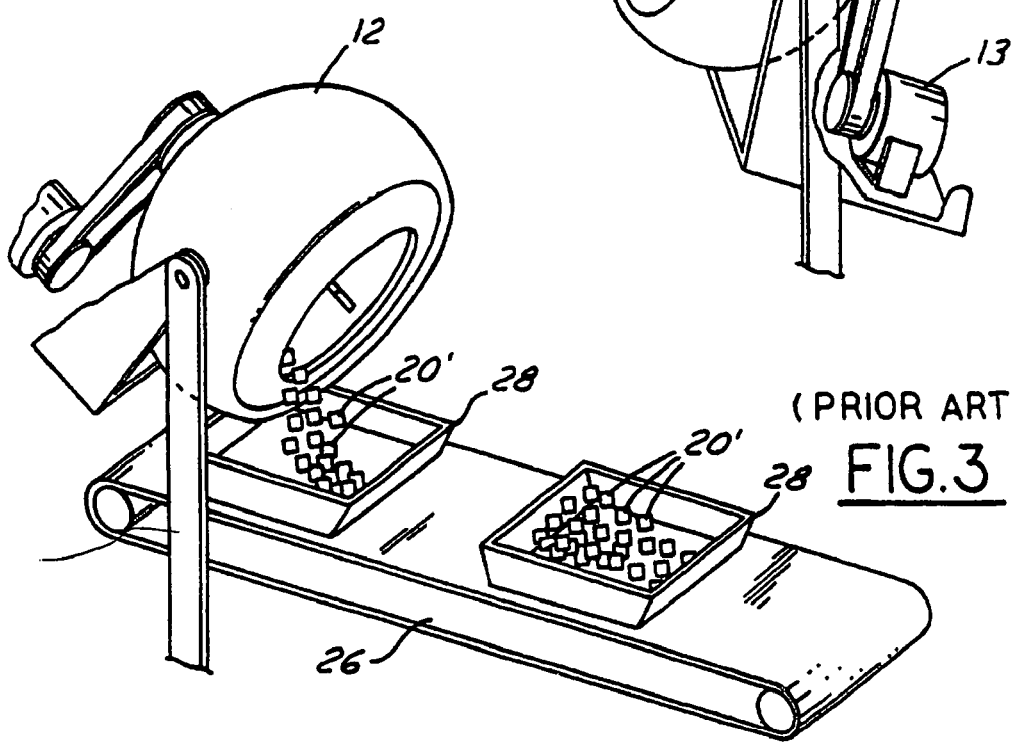
(PRIOR ART)
FIG. 3

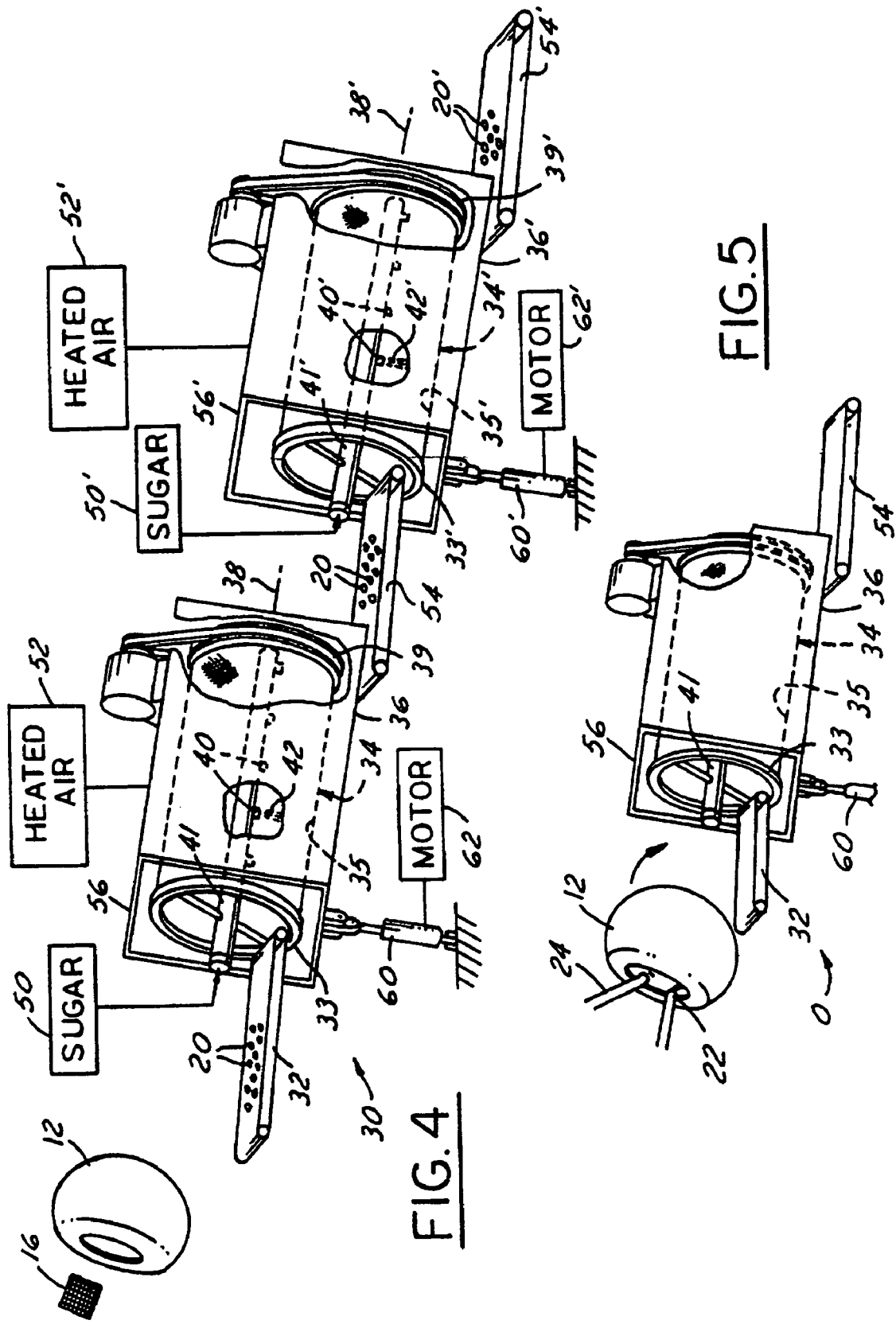

_US 7,322,311 B2_

CONTINUOUS COATINGS OF GUM PRODUCTS

CROSS-REFERENCE TO RELATED APPLICATIONS

The present application is a divisional of U.S. patent application Ser. No. 10/011,654, filed Dec. 4, 2001, which issued on Jul. 5, 2005 as U.S. Pat. No. 6,913,773, which is a continuation-in-part of U.S. patent application Ser. No. 09/374,935, filed Aug. 16, 1999, which issued on Apr. 12, 2002 as U.S. Pat. No. 6,365,203, the contents all of which are incorporated herein by reference.

TECHNICAL FIELD

The present invention relates to the continuous coating of pieces or cores of a gum material, such as chewing gum or bubble gum. The gum cores are spray coated in rotating drums while being heated and dried.

BACKGROUND OF THE INVENTION

There are numerous known coated chewing gum and bubble gum products. One of these products is the Chiclets brand chewing gum manufactured by Warner-Lambert Company. Traditionally, coated chewing gum and bubble gum products are produced by time-consuming and labor intensive batch-type manufacturing processes.

For batch-type processes, large rotating containers are utilized to coat the gum cores or pieces. Initially, the gum material is produced by a standard extrusion or batch processes and formed into large thin sheets of material several inches or a foot or more in width. Separation lines are pressed or formed into the sheets of gum forming the shapes of the smaller pieces (a/k/a "cores") of gum, and then the sheets may be stored in a cooler or under a cooled atmosphere in order to condition them for further processing.

Pursuant to the current batch-type processes used to coat the gum cores, the sheets of gum material are dumped into rotating mixers where they are separated and broken up into separate cores by a tumbling process. Thereafter, a coating solution, such as a sugar syrup, is added to the mixer while the mixer is rotating. Hot air at a temperature of approximately 120° F. is used to dry the coated cores.

In order to form a uniform and consistent coated gum product with a coat of the desired thickness, this process is repeated numerous times until the requisite coating is completed. In order to make an acceptable coating, this process can be repeated up to 40-50 times with small, thin layers being added each time. This process can take up to 6-7 hours to complete and is labor-intensive.

In the same manner, it is also possible to add a final wax coating to create a shiny surface on the coated gum products. Once all of the coating layers are completed, the coated pieces of gum are transferred to another station or area where they are assembled and packaged in a conventional manner.

It is an object of the present invention to provide an improved coating process for chewing gum and bubble gum products. It is another object of the present invention to reduce the time and labor currently required to produce coated gum products.

It is a further object of the present invention to provide a process which continuously coats pieces or cores of gum material. It is a still further object of the present invention to produce coated chewing gum and bubble gum products which are produced in a faster, less expensive, and more efficient manner than current batch-type processes.

These and other objects and purposes of the present invention will become apparent from the following description of the invention, when viewed in accordance with the attached drawings and appended claims.

SUMMARY OF THE INVENTION

The present invention provides an improved coating process for chewing gum and bubble gum products. The small cores or pieces of gum material are introduced into one or more rotating cylindrical drums which are tilted with respect to a horizontal plane. A series of spray nozzles which extend into the drum lightly coat the cores of material with a sugar solution. A continuous flow of heated air is circulated through the drums and dries the coating solution on the gum cores at the same time that the material is being coated. Where a series of drums is provided, conduits or conveyors are utilized to interconnect the drums and transport the material being coated from one drum to the other.

The formulas for the coating solution can also be adjusted at different stages of the coating process in order to provide a more consistent and uniform coating. The present invention coats chewing gum and bubble gum products in a faster, less expensive, and easier manner than processes known today, and for securing a more consistent and uniform coating.

In an alternate process, a batch-type container can be utilized to place one or more initial coating layers on the cores or pieces of gun material before they are introduced into the rotating drums.

Further objects, benefits and features of the present invention will become apparent upon a review of the following description, especially when viewed in accordance with the attached drawings and appended claims.

BRIEF DESCRIPTION OF THE DRAWINGS

FIGS. 1-3 schematically illustrate a prior art batch-type process;

FIG. 4 schematically illustrates a coating process in accordance with the present invention; and FIG. 5 schematically illustrates an alternate process for coating gum products in accordance with the present invention.

BEST MODE(S) FOR CARRYING OUT THE INVENTION

The present invention is a significant improvement over known systems for manufacturing coated chewing gum and bubble gum products. In this regard, FIGS. 1-3 illustrate a representative batch-type process which is in use today to make coated gum products.

As shown in FIG. 1, the process 10 includes a large rotating basket-type mixing apparatus 12 (a/k/a "mixer"). The mixer 12 is adapted to be rotated by a motor 13 and associated drive mechanism 17 and may include a series of baffles or ridges 14 in the interior cavity 15 which are used to help tumble materials placed inside the mixer. Sheets of chewing gum or bubble gum material 16 which are produced in a conventional manner, are introduced into the mixer 12. The gum material can be produced by any continuous extrusion or batch-type process and formed into large, flat sheets 16 which are then scored and may be placed in a cooling atmosphere a/k/a ("cooler") for conditioning. As shown in FIG. 1, the sheets of material 16 have a series of score lines 18 which are pressed or formed into the sheet of material (in any conventional manner) and outline the individual cores or pieces of gum material 20.

When the sheets of gum material 16 are introduced into the mixer 12, the rotating of the mixer separates and breaks up the sheets of material into individual small cores of material 20. The cores are sized to provide individual pieces of gum which, when coated, are packaged and then sold in the marketplace.

As shown in FIG. 2, sugar syrup 22 is added to the rotating mixer 12 in order to coat the pieces of material 20 which are being tumbled and rotated inside the mixer. The syrup 22 can be added by hand by being sprayed into the mixer through a spray nozzle or the like. Thereafter, hot air 24 is introduced into the rotating mixer in order to dry the coating syrup 22 which is coated on the cores of material 20. The air is typically at an elevated temperature, such as 80-90° F., which dries the syrup on the gum material. The air utilized in the process can be exhausted in numerous ways, such as an enclosed exhaust chute (not shown), or by simply exhausting it into the room.

In order to provide a final coated gum material with an acceptable coating having the appropriate thickness and finish, the coating, tumbling, and drying procedures as shown in FIG. 2, are repeated as much as 40-50 times before the coated cores are completed. In this regard, a thin layer is built up on the cores of material 20 in each step of the process. In this manner, the coating builds up evenly on the pieces of material.

The batch-type coating of the gum material is labor intensive and, as indicated, involves three distinct processing steps (spraying, tumbling, and drying). The prior art process can take a total of 6-7 hours to complete the 40-50 steps.

Once the pieces of material 20' are finish coated, they are dumped into individual pans 28, as shown in FIG. 3, and sent to the packaging section or area by, for example, a conveyer system 26, to be assembled into individual packages or boxes of gum material and then sent to the market.

For a shiny surface on the coated pieces of gum material, it is also possible to add a wax coating. For this purpose, the last of the numerous steps of the coating process utilizes a wax-base material rather than a sugar syrup material.

A second type of prior art process utilizes an elongated horizontal barrel in which the sheets of material are placed and follow a similar coating process. Rotation of the barrel separates the material into individual pieces, while a sugar sprayed into the center accompanied by a source of heated air coats and dries the pieces. The material remains in the barrel for numerous hours as the spraying and drying steps are repeated time after time until an appropriate thickness of coating is produced. A system for coating gum material in this manner is available from the Dumoulin company.

In accordance with the present invention, an apparatus system and method for continuously coating pieces or cores of chewing gum or bubble gum material is utilized. This system and apparatus is shown in FIG. 4 and indicated generally by the reference numeral 30.

In order to produce acceptable commercial coated gum products, a sufficient number of coatings need to be applied to provide a smooth, thick shell which, when chewed, provides a "crunchy" characteristic. Acceptable coatings are on the order of 0.1-0.5 mm in thickness and comprise about 20-40% by weight of the final gum pellet products. Preferably the coating is in the range of 30-35% by weight.

The present invention significantly speeds up the process for making such acceptable commercial-type coated chewing gum products, that is products with final, smooth, thick coatings on the order of 0.1-0.5 mm or more in thickness and comprising 30% or more by weight of the final products. In this regard, with the present invention, final products comparable in quality to those prepared by the prior art batch-type processes, can be produced in less than 50% of the time period necessary to produce the prior art products.

In accordance with the present invention, the sheets of gum material 16 are first placed into a rotating drum or mixer 12 to tumble and break them up into individual pieces of material 20. Individual cores or pieces of material 20 are then conveyed by a conveying mechanism 32 to the upstream or first end 33 of at least one rotating drum mechanism 34. In this regard, the present invention can utilize either one rotating drum mechanism 34 or, as preferred, a series of two or more rotating drum mechanisms 34, 34', as shown in FIG. 4. The number of individual drum mechanisms that are utilized in order to continuously coat the gum materials depends on a number of factors, such as the speed of the process, the thickness of the desired coating, and the quality of the finished product desired.

The drum mechanism 34 includes a frame 36 and a cylindrical drum member 35 rotatable about an axis 38 which is tilted with respect to a horizontal plane. The degree or angle of tilt also preferably is adjustable so that the length of time that the cores are in the drum member and number of layers or thickness of coating on each core of material can be adjusted as desired. For this purpose, extending support members 60 activated by motor 62 can be used to change the elevation of the drum mechanism.

In accordance with a preferred process and system of the present invention, the rotating drum member 35 is tilted or angled relative to the horizontal so that the cores of material 20 will enter and exit from the drum member in a uniform and consecutive manner. In this regard, a "first-in, first-out" system is preferred wherein the first cores of material which enter the inlet or first end 33 of the drum member are also the first cores of material to exit or leave the drum member. This will insure that all of the cores of material are treated uniformly and consistently and that the same amount of coating material and same thickness of coating will be applied to each core of gum material.

A series of spray nozzles 40 extend into each of the drum members 35 along their lengths and are used to spray a fine coating solution 42 onto the pieces or cores of gum material 20, which are introduced into them.

Preferably, the drum includes a series of angled baffles, ridges or "rifling" (not shown) with flights which tumble the pieces of material 20 as they pass from the first end 33 to the outlet or exit end 39 of each of the drum members 35.

A coating solution, such as a sugar syrup, is introduced into the drum 34 from a holding tank or container 50. The coating solution preferably has about 60-70% sugar, 30-35% water and various small percentages of other ingredients.

Heated air is introduced into the drum members 35, 35' from a pressure source 52, 52' in order to dry the pieces of material 20 which are being coated with the coating solution 42, 42'. In accordance with the present invention, the coating material is dried on the individual pieces or cores of gum material 20 at the same time as the solution is applied to the pieces of material. This insures an even consistent coating and allows the build up of numerous thin layers or amounts of coating material on each core.

The air can be introduced into the drum members 35, 35' in a number of different manners, but preferably is introduced through perforations in the side walls of the inner drum members in order to allow a substantially uniform flow of heated air throughout the interior cavity of the drum member.

When a series of rotating drum mechanisms 34, 34', etc. are utilized, small conveyor mechanisms 54 or conduits of conventional design are used to convey the pieces of material 20 being coated from one drum member to the other.

The spray nozzles 40 are fixed inside the drums and do not rotate with them. The spray nozzles 40 are positioned along one or more pipes or conduits 41 which extend along the inside of the rotating drum members 35. The sugar or other materials being coated on the cores can be applied as a liquid or dry powder, although a wet coating is preferred. If a powder is utilized, it can be introduced into the rotating drum members from a central pipe, also preferably as a spray.

The drum members are preferably tilted or inclined with respect a horizontal plane a few degrees, such as 1-5°. It is also preferable to have an adjustable mechanism 60, 62 which can change the tilt or angle of tilt of the drum members. A change in the angle of the drum members affects the speed by which the products are passed through them. Thus, it is possible to speed up or slow down the coating process as desired in order to change the thickness and/or quality of the coating.

The walls of the rotating drum members 35, 35' are preferably made from a screen or mesh so that heated air can easily pass through it. The spray nozzles 40 extend in series longitudinally within the drum member 35. The nozzles 40 are mounted to a conduit or a support 41 which is positioned inside the drum member 34 and preferably along its central axis. Each of the nozzles 40 is operably connected to a conduit or line through which the coating solution flows for emission or ejection from the nozzle.

The system used for drying the material in drum members 35, 35' preferably includes a stationary shroud or frame 56 which extends around a portion of the inner drum member 35. Air is introduced into the frame or shroud 56 through an inlet and connected to a source of air 52. This source of air can be any conventional type, such as a blower (not shown). Also, the air is heated by a heating mechanism of conventional type (not shown) such that heated air is introduced into the drum member through its perforated or meshed side walls. Preferably the air is also dehumidified.

The air is also continuously exhausted from the drum members 35, 35' in order to continuously supply new heated air to the interior of the drum member and thus dry the coating solution on the pieces of material substantially instantaneously.

In operation, the small cores or pieces of material 20 are introduced into the inlet end 33 of the first drum member 35. As the drum member rotates, pieces of material 20 flow by gravity longitudinally through the drum member for coating by the solution 42 sprayed from the nozzles 40. If desired, doors or other access members can be provided at the outlet end 39 of the drum member in order to provide an enclosed cylinder for the coating and drying process.

The drum members are rotated at approximately 15-35 rpm, depending on the desired flow rate of the material and coating solution. As the drum members rotate, the flanges, ridges or flightings inside the drum carry the pieces of material around the perimeter of the drum member and allow it to fall or tumble around inside the drum member. In this manner, a curtain or "wave" of material spaced apart from the side walls of the drum member is produced.

The nozzles 40 can be directed toward the curtain or wave of material which is formed inside drum member 35 in order to effectively coat each of the cores of material. The heated air from the air supply 52 is drawn through the material and exhausted. The heated air dries the coating solution 42 on the pieces of material 20. Preferably, the temperature of the heated air is approximately 150-250° F., and preferably within the range of 200-220° F., in order to maintain the pieces of material at a temperature of approximately 120° F. The heated air can also be directed toward the curtain or wave of material which is formed inside the rotating drum. In this manner, the coating can be dried virtually at the same time that it is applied to the cores.

As the pieces of material 20 progress along the length of the drum members 35, 35', the pieces of material are coated with successive layers or amounts of coating solution in order to build up an exterior shell.

Preferably, a computer micro-processor is utilized for controlling the operation of the continuous coating system or apparatus 30. For example, the computer can be utilized to control electrical power to the apparatus, the tilting angle of the drum members, the rotational speed of the drum members, the spraying functions of the nozzles, and the air flow and temperature in the drying system.

Preferably, the drum members 35, 35' are 10-12 feet in length although they could be, in accordance with the invention, larger or shorter in length. Also, in order to coat the materials with an acceptable coating for chewing gum and bubble gum products, preferably a series of drum members are provided. The drum members can be positioned in a continuous line, as shown in FIG. 4, or they can be provided in a stacked arrangement vertically positioned one above the other, which would utilize less floor space in the manufacturing facility.

In order to provide an even coating of material, it is desired to have each of the individual cores or pieces of material 20 proceed through the rotating drum member in substantially the same time. This means that the first pieces of material introduced into the inlet of the first drum member are also the first pieces of material which exit from, or are removed from, the drum member at its outlet end. In order to accomplish this, the angle of tilt of the rotating drum can be increased. This prevents individual pieces or groups of material from being tumbled in place, which would result in differing amount of coating solution being applied to different pieces of material in the drum member.

It is also desired to initially prevent the pieces of gum material from sticking or accumulating together in the initial drum member in a continuous coating system. Gum material, when heated or raised to an elevated temperature, becomes sticky or tacky and individual pieces of material can adhere together, which is undesirable. Therefore, the pieces of material are introduced into the first rotating drum member at a relatively low temperature. Also, the air being supplied to the initial drum member in a series of drum members can be at a lower temperature than the air temperature in subsequent drum members in order to prevent the pieces of material from sticking together until they secure one or more layers of coating solution on them. Once the pieces of material have an initial coating on them and are tumbled inside the rotating drums, the temperature of the air can be increased. Also, in order to reduce tackiness, the air introduced in the system should be dehumidified.

A continuous coating process for coating individual cores or pieces of gum material substantially reduces the cost and time for producing coated gum products. For example, a batch-type process for coating material which could take up to 6-7 hours, can be completed in 1-3 hours with the present invention. In this regard, as opposed to the prior art processes which add the coatings (spray), tumble the cores and then dry them in essentially three distinct steps, the present invention accomplishes all three of these steps at substantially the same time. Except for a brief stoppage of the spraying for nozzle cleaning (about 5 seconds per minute), the spraying, tumbling and drying procedures take place simultaneously.

Moreover, less floor space in the facility is needed in order to produce the coated products by a continuous coating process. For example, a system utilizing six rotating drum members in series could be controlled by a single person with a computer controlled process. In contrast, it would be necessary to utilize a number of batteries of up to ten mixers each and a crew of six people or more in order to produce the same quantity of coated gum material.

The capital cost for acquiring, setting up, and operating the continuous coating system are also substantially less than the cost for providing an operating batch-type process to secure similar results.

In order to provide the optimum finish for a coated product, it is desirable to insure that the first few layers of coating solution are as smooth as possible. The smoother and more uniform the initial coatings are, the smoother and more uniform the subsequent coatings and the final product will be.

In order to insure that the initial coatings are uniform and consistent, it is also possible to utilize the alternative coating process 80 as shown in FIG. 5. In that process or system 80, one or more prior art mixers 12 are utilized initially in order to break apart and provide initial coatings on the individual cores or small pieces of material.

Once one or more initial layers or amounts of coating material are provided on the pieces of material, the materials are conveyed or transported to a rotating drum member. Thereafter, all the subsequent coatings on the cores or material are provided by the continuous coating apparatus and system.

Another manner in which to improve the coating of chewing gum and bubble gum products, is to change the formula of the sugar syrup or coating solution utilized in the continuous process. The formula of the coating can be changed also from drum member to drum member in a continuous process or from an initial batch-type mixer and then to the rotating drum members. For example, a representative formula for the syrup coating is as follows:

Sugar 66%
Water 31%
Starch 1%
Gum Arabic 1%
Titanium Dioxide 1%

It is also possible to vary these percentages. For example, the sugar can be varied between 50-80% with the water content being adjusted accordingly. The other ingredients preferably are not varied more than 1-2%.

Also, more Gum Arabic could be added to the syrup to increase its percentage more than 1 percent at initial stages of the coating process. Thereafter, the Gum Arabic percentage could be dropped to 0.25 percent or less in subsequent stages of the coating process.

The rotating drum members which can be utilized with the present invention can be any conventional type of rotating mesh-type drum member, such as the continuous systems currently being provided by Coating Machinery Systems, Inc. in Ames, Iowa.

As indicated earlier, the coating material also could be a dry powder, as well as a liquid solution. Further, the coating material could be a sugarless coating as well as a sugar coating. Coatings of these types are conventional today and are known to persons of ordinary skill in the art.

With the present invention, the pieces of material are coated more uniformly and in significantly less time than is achieved in batch-type coating processing. The floor space in the facility is also reduced substantially, by 20 percent or more, compared to batch-type coating processes. The decrease in time can be 30 percent or more.

While particular embodiments of the invention have been shown and described, numerous variations and alternate embodiments will occur to those skilled in the art. Accordingly, it is intended that the invention be limited only in terms of the appended claims.

What is claimed is:

1. A system for continuously coating cores of gum material comprising:
   a mixer for breaking up sheets of gum material into individual cores of gum material;
   first conveyor mechanism for continuously transporting said cores of gum material from said mixer to a first elongated rotating drum member, said first drum member having a first end and a second end, and said first drum member being tilted at an angle relative to horizontal;
   said cores of gum material being continuously introduced into said first drum member at said first end and being removed from said first drum member at said second end,
   a plurality of nozzles positioned in said first drum member for applying coating materials on said cores of gum material in said first drum member as said cores of gum material proceed through said first drum member from said first end to said second end;
   first supply of heated air, said air having a first temperature and being introduced transmurally into said first drum member in order to dry the coating materials as they are applied to the cores of gum material;
   wherein said cores of material are processed in said first drum member on a first in-first out basis;
   second conveyor mechanism for continuously transporting said cores of gum material from said first rotating drum member to a second elongated rotating drum member in series with the drum member, said second drum member having a first end and a second end, and said second drum member being tilted at an angle relative to horizontal;
   said cores of gum material-being continuously introduced into said second drum member at said first end and being removed from said second drum member at said second end,
   a plurality of nozzles positioned in said second drum member for applying coating materials on said cores of gum material in said second drum member as said cores of gum material proceed through said second drum member from said first end to said second end;
   a second supply of heated air, said air having a second temperature and being introduced transmuraly into said second drum member in order to dry the coating materials as they are applied to the cores of gum material, said second temperature being higher than said first temperature; and
   at last one computer processor for controlling one or more of the following: air temperature in said first drum member and said second drum members; tilting angle of said first drum member and said second drum member; rotational speed of said first drum member and said second drum members; said plurality of nozzles; and air flow speed; and wherein said cores of material are processed in said second drum member on a first in-first out basis.

2. The system as recited in claim 1 further comprising a batch-type mixer mechanism for providing an initial coating of material on said cores of gum material before they are introduced into said drum member.

3. The system as recited in claim 1 wherein said coating materials arc in a liquid form and are applied to said cores of gum material by spraying.

4. The system as recited in claim 1 wherein said coating materials are in a dry powder form.

5. The system as recited in claim 1, wherein said first plurality of nozzles positioned in said first drum member having a first formula of coating material and said second plurality of nozzles positioned in said second drum member having a second formula of I coating material, wherein said second formula of coating material is different from said first formula of coating material.

6. The system as recited in claim 1, wherein said cores of gum material are maintained at a temperature of about 120° F.

7. The system as recited in claim 1, wherein said system is completed in about 1 to about 3 hours.

* * * * *